United States Patent
Davis

(10) Patent No.: US 6,945,274 B1
(45) Date of Patent: Sep. 20, 2005

(54) WATER SUPPLY SHUT OFF AND BYPASS SYSTEM

(76) Inventor: George Houston Davis, 28510 Rosewood, Inkster, MI (US) 48141

( * ) Notice: Subject to any disclaimer, the term of this patent is extended or adjusted under 35 U.S.C. 154(b) by 0 days.

(21) Appl. No.: 10/899,691

(22) Filed: Jul. 27, 2004

(51) Int. Cl.[7] .............................................. E03B 1/04
(52) U.S. Cl. ............................ 137/624.11; 251/129.04
(58) Field of Search ...................... 137/624.11, 624.12; 251/129.04; 239/70

(56) References Cited

U.S. PATENT DOCUMENTS

| | | | |
|---|---|---|---|
| 4,180,088 A | 12/1979 | Mallett | |
| 4,249,565 A | 2/1981 | Brust | |
| 4,730,637 A | 3/1988 | White | |
| 4,926,901 A | 5/1990 | Waltenburg | |
| 4,942,896 A * | 7/1990 | Slusser | 137/360 |
| 5,004,014 A | 4/1991 | Bender | |
| 5,056,554 A * | 10/1991 | White | 137/624.11 |
| 5,503,175 A | 4/1996 | Ravilious et al. | |
| 5,746,250 A * | 5/1998 | Wick | 137/624.11 |
| 5,881,755 A | 3/1999 | Dieringer | |
| 6,209,576 B1 | 4/2001 | Davis | |
| 6,491,062 B1 * | 12/2002 | Croft | 251/129.04 |
| 6,708,722 B1 | 3/2004 | Goodenough | |

* cited by examiner

*Primary Examiner*—Kevin Lee
(74) *Attorney, Agent, or Firm*—Butzel Long

(57) ABSTRACT

A modular water supply shut off and by pass system that can be installed in a standard water supply line and used to prevent water flow through the supply line except when the system is activated. The system includes a modular unit having main fluid flow line provided with a remotely actuated valve and a by pass fluid flow line provided with a manually operated valve. The system also has a control unit that includes a timing mechanism that be operated to actuate the remotely actuated valve and allow water to flow through the main fluid flow line for a period of time determined by the timing mechanism. A momentary switch is coupled to the control unit and used to actuate the timing mechanism.

20 Claims, 1 Drawing Sheet

WATER SUPPLY SHUT OFF AND BYPASS SYSTEM

TECHNICAL FIELD

The present invention relates to a water conservation system for a dwelling. More particularly, the present invention relates to a modular water supply shut off and by pass system that can be installed in a standard water supply line and used to prevent water flow through the supply line except when the system is activated.

BACKGROUND ART

Virtually all home owners are aware of how leaks in plumbing systems can damage their properties. Cleanup and repair costs attributable to water damage caused by leaks in plumbing systems exceed one billion dollars annually. Such leakage destroys wallboard, wallpaper and paint, electrical fixtures and wiring, carpeting and padding, vinyl flooring, subflooring, and all manner of furniture and decorative items. Irreplaceable items such as financial records, photos, and mementos can be destroyed beyond retrieval. Moreover, the occupants of the damaged property can expect to be driven from their structures during cleanup and repairs. Following such repairs, the structures can often be subject to mildew and related odors. In some instances hazardous molds such as black mold can become a serious problem after repair and clean up.

Structural water damage due to plumbing leakage occurs most often while the occupants of a dwelling are absent. Causes of such leakage can include frozen pipes that break and subsequently leak upon thawing, broken supply lines connected to shut-off valves attached to toilet tanks, refrigerator ice-makers, dishwashers, broken hoses connected to washing machines, etc. The breaks in these lines are often caused by the nearly instantaneous closing of associated valves. Such closing causes a hammering effect on the line, in turn causing breakage in any weak areas.

Major or catastrophic leakage cause by broken or ruptured water lines is a serious problem. However, minor leaks such as dripping faucets and plumbing joint leaks that seep or drip rather than produce a flowing leak, over time can cause serious structural damage while otherwise going unnoticed. When such minor leaks occur in walls, inside cabinets, under or behind appliances, etc. they can go on for months and even years without being detected. In addition to causing serious damage over time, such minor leaks, including leaks in toilet tanks, can contribute significantly to a home owner's water bill.

A number of water control systems have been developed as exemplified by U.S. Pat. No. 4,180,088 to Mallett, U.S. Pat. No. 4,249,565 to Brust, U.S. Pat. No. 4,730,637 to White, U.S. Pat. No. 4,926,901 to Waltenburg, U.S. Pat. No. 5,004,014 to Bender, U.S. Pat. No. 5,056,554 to White, U.S. Pat. No. 5,503,175 to Ravilious et al., U.S. Pat. No. 5,881,755 to Dieringer, U.S. Pat. No. 6,209,576 to Davis and U.S. Pat. No. 6,708,722 to Gooenough. All of the systems of these patents involve means for sensing flow or pressure which adds to the complexity of the systems and provides a potential source for failure.

The present invention provides a modular water supply shut off and by pass system that can be installed in a standard water supply line and used to prevent water flow through the supply line except when the system is activated.

DISCLOSURE OF THE INVENTION

According to various features, characteristics and embodiments of the present invention which will become apparent as the description thereof proceeds, the present invention provides a modular water supply shut off and by pass system that includes:
a) a modular unit that consists essentially of:
  a main fluid flow line;
  a remotely actuated valve provided in the main fluid flow line, the remotely actuated valve having an open position which allows water to flow through the main fluid flow line and a closed position which prevents water from flowing through the main fluid flow line;
  a by pass fluid flow line; and
  a manually operated valve provided in the by pass fluid flow line which manually operated valve is normally in the closed position so as to prevent water from flowing through the by pass fluid flow line; and
b) a control unit that includes a timing mechanism that, when actuated, causes the remotely actuated valve to stay in the open position for a limited period of time that is controlled by the timing mechanism.

The present invention further provides a method of conserving water supplied to a dwelling through a water supply line, the method involving:
a) providing a modular unit that consists essentially of:
  a main fluid flow line;
  a remotely actuated valve provided in the main fluid flow line, the remotely actuated valve having an open position which allows water to flow through the main fluid flow line and a closed position which prevents water from flowing through the main fluid flow line;
  a by pass fluid flow line; and
  a manually operated valve provided in the by pass fluid flow line which manually operated valve is normally in the closed position so as to prevent water from flowing through the by pass fluid flow line;
b) coupling the modular unit inline with the water supply line; and
c) activating the remotely actuated valve so that the remotely actuated valve is in the open position for preset periods of time when water usage in the dwelling is desired.

BRIEF DESCRIPTION OF DRAWINGS

The present invention will be described with reference to the attached drawings which are given as non-limiting examples only, in which.

BEST MODE FOR CARRYING OUT THE INVENTION

Figure 1:
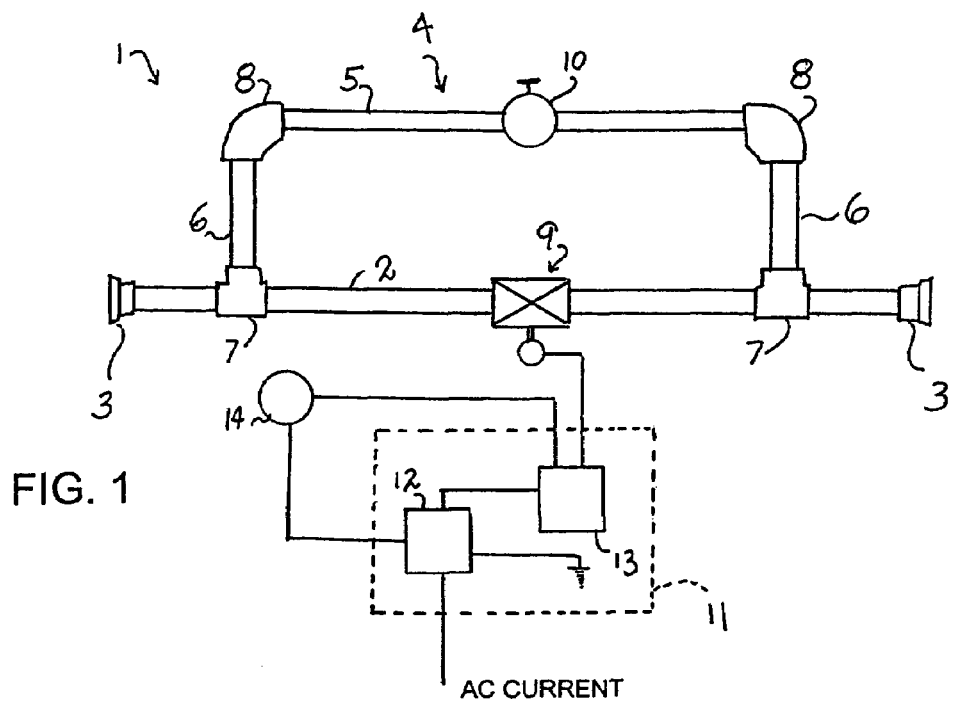
FIG. 1 is a schematic diagram of a modular water supply shut off and by pass system according to one embodiment of the present invention.

The present invention is directed to a modular water supply shut off and by pass system which is configured to be used in dwellings such as residential homes, apartments, mobile homes, vacation dwellings and commercial properties. The water shut off and by pass system is designed to be modular so that it can be easily installed inline in a conventional water supply line of a dwelling using for example standard pipe couplers such as unions on either end.

The modular water supply shut off and by pass system of the present invention includes a main line which is configured to be installed inline in a conventional water supply line of a dwelling. Opposite ends of the main line are provided with standard pipe couplers, such as unions, by which the modular water supply shut off and by pass system is connected inline in a water supply line. The main line also includes a valve that can be actuated remotely to selectively allow or prevent water from flowing through the main line and thus selectively allow or prevent water from flowing through the dwelling water supply line. Examples of remotely controlled valves include solenoid valves, poppet valves, and any other pneumatic, electropneumatic, hydraulic, electrohydraulic, electric or mechanical actuated valves that can are capable of shutting off or turning on water flow by remote activation.

The remotely actuated valve can either have a normally un-actuated closed position in which water flow is prevented through the main line or a normally un-actuated opened position in which water flow is allowed through the main line. However, as a safety precaution, a remotely actuated valve that has a normally un-actuated closed position may be preferred in case of an electrical power failure (or other actuating means failure, e.g. hydraulic, pneumatic, etc.). Otherwise, a backup actuating means such as a backup power supply could be provided as a safety precaution.

The modular water supply shut off and by pass system of the present invention includes a by pass line that is provided in parallel to the main line and which connects at opposite ends to the main line so as to straddle and by pass the remotely actuated valve. The by pass line includes a manually operated valve that is normally in the closed position, but which can be opened manually to divert water flow through the by pass line and around the remotely actuated valve in the event that a power or pneumatic or hydraulic failure causes the remotely actuated valve to be inoperable and stuck in the closed position. The manually operated valve can be a gate valve, ball valve, globe valve, butterfly valve, or any type of valve that can be operated to stop water flow.

The main line, by pass line and associated fittings, e.g. elbows, tees, couplers, etc. of the modular water supply shut off and by pass system of the present invention can be made from metals such as galvanized iron, copper, steel, etc. and plastics such as polyvinyl chloride (pvc), and other conventional materials.

The modular water supply shut off and by pass system of the present invention includes a control unit that controls the operation of the remotely actuated valve. The control unit includes a manually operated momentary switch that can be manipulated to activate a timing mechanism that supplies the activation means, i.e. electrical power, pneumatic pressure or hydraulic pressure to actuate the remotely actuated valve. The timing means also controls the duration over which the activation means is supplied to actuate the remotely actuated valve. For example, when an electrically actuated valve is used in the main line, the timing mechanism can be a time delay relay, a mechanical timer, a microchip controlled timer, etc. that upon pressing the momentary switch, supplies electrical power to the electrically actuated valve over a preset or predetermined period of time during which the remotely actuated valve is opened to allow water to flow through the main line. In the case of a pneumatically or hydraulically actuated valve in the main line, the timing means apply (or remove as appropriate) pneumatic or hydraulic force to (from) the remotely actuated valve. In a relatively simple example, the timing means could be a time delay relay, a mechanical timer, a microchip controlled timer, etc. that upon pressing the momentary switch, supplies electrical power to an valve that applies (or removes as appropriate) pneumatic or hydraulic force to (from) the remotely actuated valve, or supplies electrical power to system, i.e. pump, that generates and supplies (or removes as appropriate) pneumatic or hydraulic force to (from) the remotely actuated valve. In cases in which the remotely actuated valve is required to be activated to be in the closed position, the timing mechanism could temporarily terminate the supply of electrical, pneumatic or hydraulic power as appropriate over the preset or predetermined time period.

The modular water supply shut off and by pass system of the present invention further includes a transformer which receives standard 100–240 volt alternating current (AC) and transforms the voltage into low, e.g. 12–24 volt direct current (DC) which is supplied to both the momentary switch and the timer mechanism. The use of the transformer to supply low voltage to the system is a safety measure designed to avoid the risk of fatal or significant electrical shock to anyone operating or contacting the system in the event of an electrical short or loss of electrical grounding of the system.

The control unit can be located remotely of the modular water supply shut off and by pass. Normally, the water feed line into which the modular unit is incorporated would be in a basement of a dwelling, under a floor (e.g. in a crawl space), or in some other non-visible location, while the control unit or at least the momentary switch would be located in a convenient located that would be easy to access. The momentary switch can be located, for example in a bathroom, kitchen or laundry room, or near the entrance of a dwelling so that the system could be activated when one entered the dwelling or before one uses a bathroom, kitchen or laundry room.

In use, the momentary switch is pressed which activates the timing mechanism. The timing mechanism applies electrical power (or pneumatic or hydraulic pressure) to the remotely actuated valve to thereby open the valve for the preset or predetermined time duration controlled by the timing mechanism. After the preset or predetermined time duration the timing mechanism terminates electrical power (or pneumatic or hydraulic pressure) to the remotely actuated valve to thereby close the valve and shut water flow off.

The timing mechanism can apply electrical power (or pneumatic or hydraulic pressure) to the remotely actuated valve for any desired period of time, which can be restarted thereafter as desired by pressing the momentary switch. The modular water supply shut off and by pass system of the present invention can be used in all types of dwellings such as residential homes, apartments, mobile homes, vacation dwellings, commercial properties, rental properties, etc.

FIG. 1 is a schematic diagram of a modular water supply shut off and by pass system according to one embodiment of the present invention. The modular water supply shut off and by pass system of the present invention which is generally identified by reference number 1 in FIG. 1 includes a main line 2 that comprises a length of pipe having standard union coupling fittings 3 on opposite ends by which the modular unit 1 can be easily installed in an existing or new water supply line. In an alternative arrangement, the modular unit 1 could be coupled to a water supply line by other conventional fitting elements other than union couplings, including simple threaded couplings or connectors. However, union couplings would allow easy installation and removal of the modular unit.

A by pass line 4 is provided in parallel to the main line 2, and includes a parallel portion 5 and a pair of legs 6 that are coupled to the main line 2 by, for example tee fittings 7. The legs 6 of the by pass line 4 can be coupled to the parallel portion 5 by right angled elbow fittings 8. Alternately, in place of tee fittings 7 and right angled elbow fittings 8 the main line 2 and the by pass line 4 could comprise an integral unitary structure.

A remotely actuated valve 9 is provided in the main line 2 between the position where legs 6 of the by pass line 4 are coupled to the main line 2. The remotely actuated valve 9 illustrated in FIG. 1 is a solenoid valve. However, it is to be understood that other types of valve that are capable of shutting off or turning on water flow by remote activation such as poppet valves, or any other pneumatic, electropneumatic, hydraulic, electrohydraulic, electric or mechanical actuated valves can be used.

The by pass line 4 is provided with a manually operable shut off valve 10 which can be a gate valve, ball valve, globe valve, butterfly valve, or any type of valve that can be operated to stop water flow.

A control unit 11 is indicated in FIG. 1 in broken lines as including or housing a transformer 12 and timing mechanism 13. The transformer 12 receives a high voltage current such as a standard 100–240 volt alternating current (AC) and transforms the high voltage current to a lower voltage direct current (DC) such as 12–24 volts. The low voltage DC is fed from the transformer 12 to the timing mechanism 13 which, according to one embodiment of the present invention, is a timed delay relay. The low voltage DC is also fed from the transformer 12 to a momentary switch 14 which can be located in the control unit 11 or at a remote location. The momentary switch 14 can be of any type including a throw switch, a toggle switch, a push button switch, a rocker switch, etc. When the momentary switch 14 is depressed or manually operated it activates the timing mechanism 13 which then feeds the low voltage DC to the remotely actuated valve 9. The timing mechanism 13 feeds the low voltage DC to the remotely actuated valve 9 for a preset or predetermined time duration. According to one embodiment of the present invention a time delay relay set to time out at 6–12 hours was found to be suitable for used in conjunction with a solenoid valve. However, much shorter, e.g. 30 minutes or longer delay periods could be used depending on the water use in a particular dwelling and situation.

Figure 2:
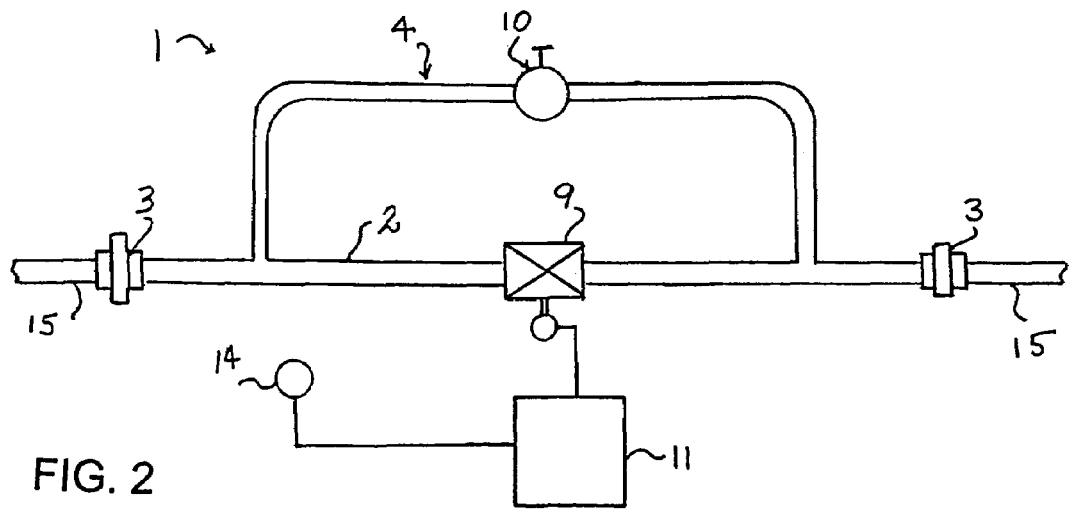
FIG. 2 is a schematic diagram of a modular water supply shut off and by pass system according to one embodiment of the present invention installed in a water supply line.

FIG. 2 is a schematic diagram of a modular water supply shut off and by pass system according to one embodiment of the present invention installed in a water supply line. In FIG. 2 the modular unit 1 that includes the main line 2 and by pass line 4 is depicted as being an integral unitary structure. As shown, the modular water supply shut off and by pass system 1 is connected to water supply line 15 by standard pipe couplers such as unions 3 that are provided on either end of the modular unit 1. FIG. 2 depicts the control unit 11 as comprising a housing that includes the elements, e.g., transformer and timing mechanism, depicted in FIG. 1. As suggested in FIG. 2 and discussed in detail above, the control unit 11 can be positioned near the modular water supply shut off and by pass system 1 and the momentary switch 14 can be position more remotely at any convenient location in a dwelling.

When the modular water supply shut off and by pass system 1 is not activated the remotely actuated valve 9 is in a closed position that prevents water from flowing through main line 2. Also, manually operated valve 10 is also in a closed position that prevents water from flowing through by pass line 4. Upon entering a dwelling or otherwise desiring to turn on the water supply to a dwelling, a person operates momentary switch 14 by pushing or toggling the momentary switch 14. Once the momentary switch 14 is operated low voltage DC is fed from momentary switch 14 to timing mechanism 13, which then activates remotely actuated valve 9 for a preset or predetermined period of time. The activation of remotely actuated valve 9 cause remotely actuated valve 9 to open, thereby allowing water to flow through main line 2. After the preset or predetermined activation time that is controlled by the timing mechanism 13, the remotely actuated valve 9 goes back to the closed position, once again preventing water from flowing through main line 2. If a power failure should occur or if the system fails to operate, water flow through the system can be achieved by merely opening manually operated valve 10 which will allow water to flow through the by pass line 4.

The modular system of the present invention can be easily installed in a water feed line of a dwelling by removing a comparable length of pipe from the water supply line and installing standard pipe couplers such as unions on either opened section of the water supply line where the length of pipe has been removed and coupling the ends of the modular unit to the open sections of the water supply line. Once coupled to the water supply line the control unit can be plugging into a standard electrical receptacle, preferable one provided with a ground fault detector, to supply AC to the transformer in the control unit. The momentary switch can be located at any convenient location and electrically coupled to the control unit as discussed above. It is possible according to the present invention to use a momentary switch which is wireless, i.e. one that is independently powered (for example by a battery) and transmits an actuation signal to a receiver coupled to the timing mechanism.

The modular water supply shut off and by pass system of the present invention is simple to operate, simple to install and is less prone to failure and less expensive than more complicated systems that include flow sensing devices.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

What is claimed is:

1. A modular water supply shut off and by pass system that comprises:
   a) a modular unit that consists essentially of:
      a main fluid flow line;
      a remotely actuated valve provided in the main fluid flow line, the remotely actuated valve having an open position which allows water to flow through the main fluid flow line and a closed position which prevents water from flowing through the main fluid flow line, said remotely actuated valve being in the closed position until activated;
      a by pass fluid flow line; and
      a manually operated valve provided in the by pass fluid flow line which manually operated valve is normally in the closed position so as to prevent water from flowing through the by pass fluid flow line;
   b) a control unit that includes a timing mechanism that, when actuated, causes the remotely actuated valve to stay in the open position for a predetermined duration of time that is controlled by the timing mechanism; and c) a manually operated switch that activates the control unit.

2. A modular water supply shut off and by pass system according to claim 1, wherein the timing mechanism is a time delay relay.

3. A modular water supply shut off and by pass system according to claim 2, wherein the remotely actuated valve is a solenoid valve.

4. A modular water supply shut off and by pass system according to claim 1, wherein the by pass fluid flow line has ends that are coupled to the main fluid flow line, and the main fluid flow line has free ends that are configured to be coupled inline to a water supply line in a dwelling.

5. A modular water supply shut off and by pass system according to claim 1, wherein the timing mechanism operates on low voltage current.

6. A modular water supply shut off and by pass system according to claim 1, wherein the control unit includes a transformer that converts high voltage alternating current to low voltage direct current.

7. A modular water supply shut off and by pass system according to claim 1, wherein the manually operated switch is a momentary switch that activates the timing mechanism.

8. A modular water supply shut off and by pass system according to claim 7, wherein the control unit includes a housing and the momentary switch can be positioned apart from the housing of the control unit.

9. A modular water supply shut off and by pass system according to claim 8, wherein the momentary switch is a wireless switch.

10. A modular water supply shut off and by pass system according to claim 1, wherein the main fluid flow line and the by pass fluid flow line are made from one of metals or plastic materials.

11. A method of conserving water supplied to a dwelling through a water supply line, said method comprising:

a) providing a modular unit that consists essentially of:
   a main fluid flow line;
   a remotely actuated valve provided in the main fluid flow line, the remotely actuated valve having an open position which allows water to flow through the main fluid flow line and a closed position which prevents water from flowing through the main fluid flow line, said remotely actuated valve being in the closed position until activated;
   a by pass fluid flow line; and
   a manually operated valve provided in the by pass fluid flow line which manually operated valve is normally in the closed position so as to prevent water from flowing through the by pass fluid flow line;

b) coupling the modular unit inline with the water supply line; and c) activating the remotely actuated valve so that the remotely actuated valve is in the open position for predetermined duration of time when water usage in the dwelling is desired.

12. A method of conserving water according to claim 11, wherein the step of activating the remotely actuated valve in step c) is accomplished by providing a control unit that includes a timing mechanism and a manually operated switch and manipulating the manually operated switch to actuate the timing mechanism so as to cause the remotely actuated valve to stay in the open position for a predetermined duration of time when water usage in the dwelling is desired.

13. A method of conserving water according to claim 12, wherein the manually operated switch is a momentary switch that activates the timing mechanism and operating the momentary switch to active the timing mechanism.

14. A method of conserving water according to claim 13, wherein the control unit includes a housing and the method further comprises positioning the momentary switch apart from the housing.

15. A method of conserving water according to claim 14, wherein the momentary switch is a wireless switch.

16. A method of conserving water according to claim 11, wherein the dwelling comprises one of a home or apartment.

17. A method of conserving water according to claim 12, wherein the timing mechanism is a time delay relay.

18. A method of conserving water according to claim 11, wherein the remotely actuated valve is a solenoid valve.

19. A method of conserving water according to claim 11, wherein the modular unit is coupled inline with the water supply line in step b) using union fittings.

20. A method of conserving water according to claim 11, wherein the control unit is provided with a transformer that converts high voltage alternating current to low voltage direct current.

* * * * *